April 24, 1956     F. H. VOGELSANG     2,742,794
VARIABLE PITCH V-BELT DRIVE
Filed Feb. 10, 1953
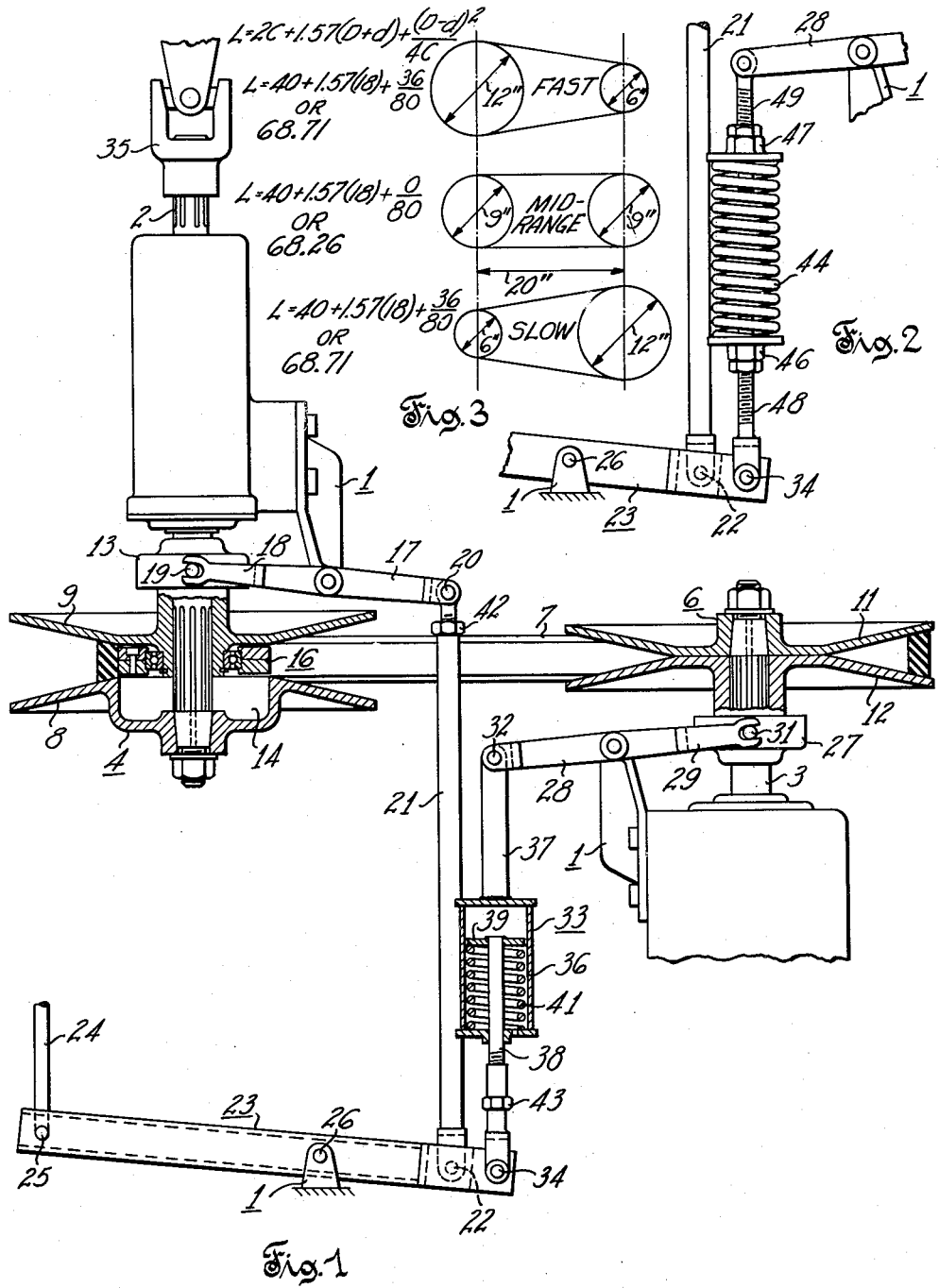

United States Patent Office 2,742,794
Patented Apr. 24, 1956

2,742,794

VARIABLE PITCH V-BELT DRIVE

Francis H. Vogelsang, La Porte, Ind., assignor to Allis-Chalmers Manufacturing Company, Milwaukee, Wis.

Application February 10, 1953, Serial No. 336,137

6 Claims. (Cl. 74—230.17)

The present invention relates to a variable speed transmission and is more particularly concerned with means for providing a drive belt in a variable speed transmission with the proper tension to carry the desired load.

In the prior art, spring constructions have been employed to resiliently urge an axially movable sheave section against a complementary axially fixed sheave section for the purpose of providing a proper belt tension at different transmission ratios. However such prior art constructions are believed to have not been entirely satisfactory, particularly in the matter of affording proper belt tension throughout the full range of transmission ratios.

It is a well known fact that when a given amount of mechanical power is transmitted by a belt, the tension on the tight side of the belt is inversely proportional to the speed of the belt, neglecting the effects of centrifugal force. Hence, if the effective pitch diameter of the driving sheave in a variable speed V-belt drive is increased and at the same time the effective sheave diameter of the driven sheave is correspondingly decreased, the resulting increase of the belt speed tends to diminish the belt tension, provided that the amount of power transmitted at the higher belt speed is the same as that transmitted at the lower belt speed, and that the effect of centrifugal force at the higher belt speed is of negligible magnitude. Conversely, if a variable pitch V-belt drive is adjusted so as to reduce the speed of the driven sheave the belt may tend to slip due to the increase of belt tension which is required to operate the drive without change of net power output. Considering that in a V-belt drive the ability of the belt to transmit power without slippage depends on the side pressure of the belt against the converging sheave surfaces, it is apparent that for the transmission of a given amount of power such side pressure of the belt may be lighter at high belt speeds than at low belt speeds.

The principal object of the present invention is to provide an improved variable pitch V-belt drive in which the side pressure of the belt against the converging sheave surfaces is so controlled as to afford substantially uniform efficiency of the drive at all belt speeds.

More specifically, it is an object of the invention to provide an improved variable speed drive of the hereinabove outlined character incorporating a spring mechanism for urging an axially movable sheave section towards a complementary axially fixed sheave section, and wherein maximum spring pressure is applied to the movable sheave section when the drive is adjusted for minimum operating speed.

Another object of this invention is to provide means for compensating for differences in theoretical belt lengths that occur as the sheaves are moved from one operating speed to another in a variable speed transmission.

Another object of this invention is to provide an improved V-belt speed change transmission wherein speed adjustment can be readily accomplished.

Another object of this invention is to provide mechanism easily adjustable for compensating for normal stretch, wear and manufacturing tolerance of V-belts in a speed change mechanism.

The significance of the previously stated objects and the manner in which they may be readily accomplished will become apparent as the disclosure progresses and particularly points out additional objects, advantages and features which are considered of special importance. Accordingly, the invention may be considered as consisting of the various details of construction, correlation of elements and arrangements of parts as is more fully set forth in the appended claims and the detailed description, reference being had to the accompanying drawing, in which:

Fig. 1 is a plan view of a speed changing mechanism with some parts in section for the sake of clarity of illustration;

Fig. 2 is a plan view of a portion of a speed changing mechanism similar to Fig. 1 showing a modification thereof; and Fig. 3 is a diagrammatic showing of the differences in theoretical belt lengths encountered in speed changing devices.

Referring to the drawing, the numerals 1 represent parts of a suitable frame structure or support in which are suitably journaled a drive shaft 2 and a driven shaft 3. On these shafts are mounted expansible cone sheaves 4 and 6, respectively, each consisting of a pair of disks or members having conical belt contacting surfaces arranged to face each other. These sheaves are connected by a driving V-belt 7 of conventional type which communicates motion from the drive shaft 2 to the driven shaft 3. The drive sheave 4 on the shaft 2 has one of its disks 8 wedged upon or otherwise axially fixed to the shaft 2 and its other disk 9 arranged to slide loosely on splines of shaft 2 toward and away from the fixed disk 8. The sheave 6 on the driven shaft 3 is similarly constructed having a disk 11 secured in axially fixed position on shaft 3 and its other disk 12 mounted to slide on splines of shaft 3 toward and away from the disk 11. The loose or movable disks 9 and 12 of the two sheaves are, like the fixed disks 8 and 11, arranged to abut opposite sides of the driving belt 7, that is, the loose disk 9 of the sheave 4 is arranged to bear against one side of the belt, while the corresponding loose disk 12 of the sheave 6 is arranged to bear against the opposite side of the belt.

A shift collar 13 is mounted about a rear hub portion of loose disk 9 so that loose disk 9 can rotate relative to collar 13. Fixed disk 8 is provided with an opening 14 about shaft 2 and in the belt contacting surface thereof for receiving a pulley structure 16 rotatably mounted on a forward hub portion of disk 9. This pulley structure 16 functions as a supporting idler for belt 7 when pulley 4 has been expanded axially to its limit as is shown in Fig. 1. That is, when shaft 2 is rotating in the condition of the mechanism as shown in Fig. 1, such rotation is not transmitted to belt 7 as the belt is not contacting disks 8 and 9 but is merely contacting pulley assembly 16 which remains stationary. A lever 17 is pivotally mounted at a point intermediate its ends on frame structure 1 and has a bifurcated end 18 pivotally engaged with diametrically opposed studs 19 on collar 13. The other end of lever 17 is pivotally attached at 20 to the upper end of a push rod 21, and an actuating beam 23 for the push rod 21 is pivotally mounted on the frame structure 1 at a center 26 and pivotally connected with the lower end of the push rod 21 at a pivot center 22. An operating rod 24 for the actuating beam 23 is pivotally connected with the latter at a center 25.

Disk 12 is provided with a shift collar 27 similar to shift collar 13, shift collar 27 and disk 12 being connected in axial thrust transmitting, rotatable relation to each other. A lever 28, similar to lever 17, is pivotally mounted at a point intermediate its ends on frame structure 1. Lever 28 is provided with a bifurcated end portion 29 which pivotally engages a pair of diametrically opposed studs 31 on collar 27. The other end of lever 28 is pivotally attached at a center 32 to the upper end of a tension spring assembly 33. The actuating beam 23 is pivotally connected with the lower end of the spring assembly 33 at a pivot center 34 which is spaced a greater distance from the pivot center 26 than the pivot center 22.

Tension spring assembly 33 includes a compression spring housing 36 rigidly attached to a member 37 pivotally connected with lever 28 at 32. A tension rod or spring actuating member 38 which has a lower end pivotally attached at 34 to beam 23, and whose upper part is slidably received within housing 36 is provided with an end member 39 slidably received within housing 36. A compression spring 41 is mounted within housing 36 about rod 38 between end member 39 thereof and an end wall of housing 36.

Referring to Fig. 1 it is seen that the linkage for moving disk 12 along shaft 3 includes a first lever between centers 26 and 34, and that the part of beam 23 which extends between centers 26 and 22 forms a second, shorter lever for moving disk 9 along shaft 2. The first lever 26, 34 and the movable member 12 of the driven sheave 6 are operatively interconnected by resilient means including the spring 41. The second lever 26, 22, on the other hand, is operatively connected in nonresilient load transmitting relation with the movable member 9 of the driving sheave 4 by means of the push rod 21. With this linkage mechanism, the drive belt is not subjected to operating tensions far in excess of those needed to carry the load, and the belt tension is properly controlled to avoid slippage. The maximum spring load is present when the pitch diameter of the driven sheave is the greatest and is the least when the pitch diameter of that sheave is the least, compression spring 41 functioning as an absorbing means for adjusting for the difference in lengths of the portion of beam 23 extending between centers 26 and 22, and between centers 26 and 34.

It is to be noted that the length of push rod 21 may be readily varied by adjustment 42 to provide for manufacturing tolerances. It will also be noted that tension rod 38 may be adjusted at 43 to increase or decrease operating tension on the belt as required. In view of the fact that shaft 2 is provided with a universal connection 35, the drive housing 1 can be moved so as to increase or decrease center distance of the sheaves providing an adjustment for belt lengths.

The operation of this speed changing mechanism is as follows: Assume that sheaves 4 and 6 are adjusted to the position shown in Fig. 1 and that shaft 2 is rotating, then sheave members 8 and 9 also are rotating. Pulley 16 is not rotating and neither is sheave 6 because the sides of belt 7 are not in contact with sheave members 8 and 9. In this position the side pressure applied against the belt 7 by the movable section 12 of the sheave 6 is at a maximum as compression spring 41 is compressed to a maximum. Now if it is desired to drive shaft 3, operating rod 24 is moved downwardly which results in beam 23 pivoting counterclockwise about pivot axis 26, push rod 21 moves upwardly acting on end 20 of lever 17 to move the bifurcated other end of lever 17 downwardly thereby moving sheave member 9 toward sheave member 8. When sheave members 8 and 9 contact the sides of belt 7 movement of the belt starts. During this process while push rod 21 has been moving upwardly, tension rod 38 has also been moving upwardly relieving some of the compression on spring 41 and thus permitting members 11 and 12 to spread apart by the pressure exerted thereon by belt 7. From the foregoing it is apparent that if operating rod 24 is moved downwardly until members 8 and 9 are contacting belt 7 positioned therebetween at maximum pitch diameter that members 11 and 12 will have moved apart to their minimum pitch diameter position and that the minimum amount of pressure will be exerted by compression spring 41 when in this position.

Another embodiment of a compensating mechanism is shown in Fig. 2 wherein a tension spring 44 is positioned between a pair of spring plugs 46 and 47 which are threadably engaged with rods 48 and 49, respectively. The lower end of rod 48 is pivotally attached to beam 23 at pivot center 34 and the upper end of rod 49 is pivotally attached to lever 28 at pivot center 32. Rod 49 is provided with left hand threads while rod 48 is provided with right hand threads. The tension in spring 44 is adjustable by turning spring plugs 46 and 47 relative to rods 48 and 49, respectively. This adjustment of the spring also provides for take up and adjustment required to properly fit new belts into the speed changing mechanism. This compensating mechanism will provide the same results as the mechanism shown in Fig. 1 and the details of such compensation will not be here repeated.

Spring 41, and similarly spring 44, also compensates for differences in theoretical belt lengths that occur as the sheaves are moved from one operating speed to another. This change in theoretical belt length can best be explained by referring to Fig. 3 which diagrammatically shows a speed changing mechanism which can be considered as having a solid connecting link in place of the aforementioned compensating mechanism including either spring 41 or 44 and the differential lever arm amounting to the difference in length of the position of beam 23 extending between pivot centers 26 and 22, and pivot centers 26 and 34. Fig. 3 shows a speed changing mechanism in three different positions of adjustment. Illustrative dimensions have been assigned to the pitch diameters and distance between shaft centers so that the difference in theoretical belt lengths for different positions of adjustment can be shown. The theoretical belt length is determined by the formula:

$$L = 2c + 1.57(D+d) + \frac{(D-d)^2}{4c}$$

Where
$L$ = Length of belt
$c$ = Center distance between sheaves
$D$ = Diameter of large sheave
$d$ = Diameter of small sheave In the fast position at the top of Fig. 3, the driving sheave is shown to have a pitch diameter of twelve inches, and the driven sheave is shown to have a pitch diameter of six inches. In the midrange position in the middle of Fig. 3 both sheaves are shown to have a pitch diameter of nine inches, and in the slow position at the bottom of Fig. 3 the driving and driven sheaves are shown to have pitch diameters of six and twelve inches, respectively. The center distance between sheaves is shown to be twenty inches in each of the three positions illustrated by Fig. 3.

Applying the belt length formula, it is found that the belt length for both the fast and slow positions comes out to be 68.71 inches, while for the midrange position it comes out to be 68.26 inches. In other words, the midrange position calls for a belt which is approximately one half inch shorter than the theoretical belt length for each of the extreme positions. In the drive illustrated in Fig. 1, in which the belt length is the same, or practically the same, for all transmission ratios, the differences of theoretical belt length for various transmission ratios are accommodated by the compensating mechanism incorporating the spring 41, or in the modified construction the spring 44. Due to the action of this compensating mechanism the driven disk 12 is resiliently urged toward its mating disk 11 with the result that pitch diameter of pulley 6 automatically adjusts itself to the theoretically correct belt length.

It should be understood that it is not intended to limit the invention to the exact details of construction and combination herein disclosed by way of example, as various modifications within the scope of the appended claims may occur to persons skilled in the art.

It is claimed and desired to secure by Letters Patent:

1. In a variable speed mechanism comprising driving and driven sheaves each including an axially fixed and an axially movable belt contacting member, a belt operatively connecting said sheaves, and actuating means for simultaneously contracting one sheave while expanding the other, the improvement comprising a first lever forming part of said actuating means and operatively connected with the movable member of said driven sheave for expanding or contracting its pitch diameter, a second lever forming part of said actuating means and operatively connected in nonresilient load transmitting relation with the movable member of said driving sheave for expanding and contracting the pitch diameter of the latter, the effective length of said first lever being greater than the effective length of said second lever, and resilient means including a spring operatively interconnected between said first lever and the movable member of said driven sheave for exerting greatest pressure against said belt by the members of said driven sheave when said driven sheave is at greatest pitch diameter.

2. In a variable speed mechanism comprising driving and driven sheaves each including an axially fixed and an axially movable belt contacting member, a belt operatively connecting said sheaves, and actuating means for simultaneously contracting one sheave while expanding the other, the improvement comprising a first lever forming part of said actuating means and operatively connected with the movable member of said driven sheave for expanding or contracting its pitch diameter, a second lever forming part of said actuating means and operatively connected with the movable member of said driving sheave for expanding and contracting the pitch diameter of the latter, the effective length of said first lever being greater than the effective length of said second lever, and resilient means operatively interconnected between said first lever and the movable member of said driven sheave whereby greatest pressure is exerted against said belt by the members of said driven sheave when said driven sheave is at greatest pitch diameter, said resilient means including a spring housing connected to the movable member of said driven sheave, a compression spring enclosed within said housing, and a spring actuating member contacting one end of said spring and having a portion passing through said spring and housing to a point of connection with said first lever.

3. In a variable speed mechanism comprising driving and driven sheaves each including an axially fixed and an axially movable belt contacting member, a belt operatively connecting said sheaves, and actuating means for simultaneously contracting one sheave while expanding the other, the improvement comprising a first lever forming part of said actuating means and operatively connected with the movable member of said driven sheave for expanding or contracting its pitch diameter, a second lever forming part of said actuating means and operatively connected with the movable member of said driving sheave for expanding and contracting the pitch diameter of the latter, the effective length of said first lever being greater than the effective length of said second lever, and resilient means operatively interconnected between said first lever and the movable member of said driven sheave for exerting greatest pressure against said belt by the members of said driven sheave when said driven sheave is at greatest pitch diameter, said actuating means including a beam carried by said mechanism, one end portion of said beam comprising said first and second levers extending in the same direction from the pivot center of said beam, the other end portion of said beam being connected to an actuating rod for operating said mechanism.

4. In a variable speed mechanism comprising driving and driven sheaves each including an axially fixed and an axially movable belt contacting member, a belt operatively connecting said sheaves, and actuating means for simultaneously contracting one sheave while expanding the other, the improvement comprising a first lever forming part of said actuating means and operatively connected with the movable member of said driven sheave for expanding or contracting its pitch diameter, a second lever forming part of said actuating means and operatively connected with the movable member of said driving sheave for expanding and contracting the pitch diameter of the latter, the effective length of said first lever being greater than the effective length of said second lever, and resilient means operatively interconnected between said first lever and the movable member of said driven sheave for exerting greatest pressure against said belt by the members of said driven sheave when said driven sheave is at greatest pitch diameter, said resilient means including a spring housing connected to the movable member of said driven sheave, a compression spring enclosed within said housing, and a spring actuating member contacting one end of said spring and including a portion passing through said spring and housing to a point of connection with said first lever, said actuating means including a beam pivotally mounted on said mechanism, one end portion of said beam comprising said first and second levers extending in the same direction from the pivot center of said beam, the other end portion of said beam being connected to an actuating rod for operating said mechanism.

5. In a variable speed mechanism comprising driving and driven sheaves each including an axially fixed and an axially movable belt contacting member, a belt operatively connecting said sheaves, and actuating means for simultaneously contracting one sheave while expanding the other, the improvement comprising a first lever forming part of actuating means and operatively connected with the movable member of said driven sheave for expanding or contracting its pitch diameter, a second lever forming part of said actuating means and operatively connected in nonresilient load transmitting relation with the movable member of said driving sheave for expanding and contracting the pitch diameter of the latter, the effective length of said first lever being greater than the effective length of said second lever, and resilient means including a tension spring operatively interconnected between said first lever and the movable member of said driven sheave for exerting greatest pressure against said belt by the members of said driven sheave when said driven sheave is at greatest pitch diameter.

6. In a variable speed mechanism comprising driving and driven sheaves each including an axially fixed and an axially movable belt contacting member, a belt operatively connecting said sheaves, and actuating means for simultaneously contracting one sheave while expanding the other, the improvement comprising a first lever forming part of said actuating means and being operatively connected with the movable member of said driven sheave for expanding or contracting its pitch diameter, and a second lever forming part of said actuating means and being operatively connected with the movable member of said driving sheave for expanding or contracting the pitch diameter thereof, the length of said first lever being greater than the length of said second lever, said actuating means including a beam pivotally mounted between end portions thereof on said mechanism, one end portion of said beam comprising said first and second levers extending in the same direction from the pivot center of said beam, the other end portion of said beam being connected to an actuating rod for operating said mechanism.

References Cited in the file of this patent

UNITED STATES PATENTS

| 692,120 | Conner | Jan. 28, 1902 |
| 2,183,267 | Rieser | Dec. 12, 1939 |
| 2,573,937 | Turnbull | Nov. 6, 1951 |

FOREIGN PATENTS

| 11,307 | Great Britain | of 1904 |
| 136,293 | Germany | Nov. 24, 1902 |